US012446216B2

(12) United States Patent  
Huang et al.

(10) Patent No.: US 12,446,216 B2  
(45) Date of Patent: Oct. 14, 2025

(54) MEMORY DEVICE

(71) Applicant: TAIWAN SEMICONDUCTOR MANUFACTURING COMPANY, LTD., Hsinchu (TW)

(72) Inventors: Chien Hui Huang, Tainan (TW); Kao-Cheng Lin, Taipei (TW); Wei Min Chan, New Taipei (TW); Shang Lin Wu, Hsinchu County (TW); Chia-Chi Hung, Hsinchu (TW); Wei-Cheng Wu, Hsinchu (TW); Chia-Che Chung, Hsinchu (TW); Pei-Yuan Li, New Taipei (TW); Chien-Chen Lin, Kaohsiung (TW); Yung-Ning Tu, Changhua County (TW); Yen Lin Chung, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 133 days.

(21) Appl. No.: 18/350,365

(22) Filed: Jul. 11, 2023

(65) Prior Publication Data

US 2025/0024671 A1 Jan. 16, 2025

(51) Int. Cl.  
*G11C 17/00* (2006.01)  
*G11C 5/06* (2006.01)  
*G11C 11/56* (2006.01)  
*H10B 20/00* (2023.01)

(52) U.S. Cl.  
CPC ............. *H10B 20/50* (2023.02); *G11C 5/063* (2013.01); *G11C 11/5692* (2013.01)

(58) Field of Classification Search  
CPC ...... H10B 20/50; G11C 5/063; G11C 11/5692  
USPC .......................................................... 365/104  
See application file for complete search history.

(56) References Cited

U.S. PATENT DOCUMENTS

| | | | | |
|---|---|---|---|---|
| 4,931,996 A * | 6/1990 | Yasuda | .................. | H10B 20/00 257/E27.102 |
| 5,049,515 A * | 9/1991 | Tzeng | .................... | H10B 69/00 438/258 |
| 5,742,540 A * | 4/1998 | Wakasugi | .............. | G11C 17/12 257/E27.102 |
| 6,656,803 B2 * | 12/2003 | Chan | ....................... | H01L 21/76 257/E21.574 |
| 7,564,134 B2 * | 7/2009 | Yang | ...................... | G11C 5/063 257/E27.098 |
| 7,606,966 B2 * | 10/2009 | Li | ....................... | G11C 16/3418 711/103 |
| 7,869,250 B2 * | 1/2011 | Kato | ................... | G11C 11/4097 365/72 |
| 8,405,163 B2 * | 3/2013 | Becker | .................. | G06F 30/392 257/E27.028 |
| 10,038,000 B2 * | 7/2018 | Wu | ........................ | H10B 20/25 |
| 10,102,911 B2 * | 10/2018 | Kasai | ................. | H10D 84/0109 |

(Continued)

*Primary Examiner* — Viet Q Nguyen  
(74) *Attorney, Agent, or Firm* — Birch, Stewart, Kolasch & Birch, LLP

(57) ABSTRACT

A memory device is provided which includes a first memory cell including a first transistor and a second transistor coupled to the first transistor in parallel. Gates of the first transistor and the second transistor are coupled to each other, and the gates of the first transistor and the second transistor pass different layers and overlap with each other. Types of the first transistor and the second transistor are the same.

20 Claims, 13 Drawing Sheets

(56) References Cited

U.S. PATENT DOCUMENTS

| | | | |
|---|---|---|---|
| 11,087,832 B1* | 8/2021 | Gomes | G11C 11/412 |
| 12,046,308 B2* | 7/2024 | Li | H01L 29/66136 |
| 2001/0025980 A1* | 10/2001 | Bottini | H10B 41/30 |
| | | | 257/315 |

* cited by examiner

MEMORY DEVICE

BACKGROUND

Read-Only Memory (ROM) usually adopts one N-typed Metal-Oxide-Semiconductor Field Transistor (NMOSFET) as its ROM cell. However, the speed of the ROM with one NMOSFET is limited, and the area of the ROM with two separated gate signals is large.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
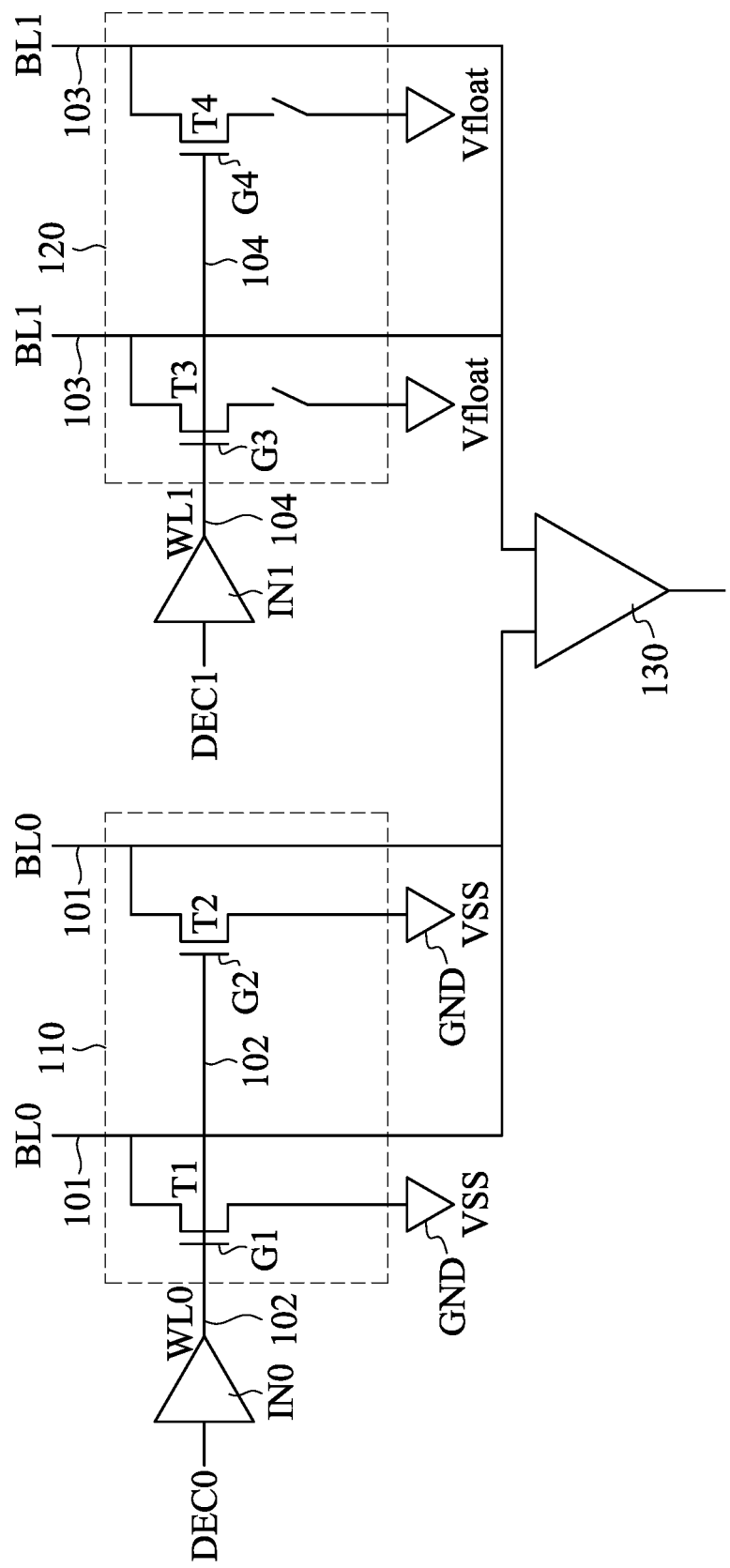
FIG. 1 is a schematic diagram of part of a memory device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Reference is now made to FIG. 1. FIG. 1 is a schematic diagram of part of a memory device 100, in accordance with some embodiments of the present disclosure. For illustration, the memory device 100 includes an inverter IN0, a memory cell 110, an inverter IN1, a memory cell 120, and a multiplier 130.

In some embodiments, the inverter IN0 is coupled to the memory cell 110. The inverter IN1 is coupled to the memory cell 120. The multiplier 130 is coupled to the memory cell 110 and the memory cell 120.

In some embodiments, the memory cell 110 includes a transistor T1 and a transistor T2. The transistor T1 is coupled to the transistor T2 in parallel. For example, the upper terminal of the transistor T1 and the upper terminal of the transistor T2 are coupled to the bit lines 101, and the lower terminal of the transistor T1 and the lower terminal of the transistor T2 are coupled to the ground GND.

For illustration of operation, the upper terminal of the transistor T1 and the upper terminal of the transistor T2 are configured to receive bit line signals BL0 from the bit lines 101. In other words, the upper terminal of the transistor T1 and the upper terminal of the transistor T2 are configured to receive the same bit line signals BL0 from the bit lines 101. The voltage level stored in the transistor T1 and the voltage level stored in the transistor T2 are the same since the upper terminal of the transistor T1 and the upper terminal of the transistor T2 are configured to receive the same bit line signals BL0 from the bit lines 101. For example, the voltage level stored in the transistor T1 is the high voltage level representing logic "1", and the voltage level stored in the transistor T2 is also the high voltage level representing logic "1". In various embodiments, the voltage level stored in the transistor T1 is the low voltage level representing logic "0", and the voltage level stored in the transistor T2 is also the low voltage level representing logic "0".

For illustration of operation, the lower terminal of the transistor T1 and the lower terminal of the transistor T2 are configured to receive the ground signal VSS from the ground GND. In other words, the lower terminal of the transistor T1 and the lower terminal of the transistor T2 are configured to receive the same ground signal VSS from the ground GND.

In some embodiments, gates of the transistor T1 and the transistor T2 are coupled to each other. For example, the gate G1 of the transistor T1 and the gate G2 of the transistor T2 are coupled to each other. In various embodiments, the gate G1 of the transistor T1 and the gate G2 of the transistor T2 are coupled to the word line 102.

For illustration of operation, the gate G1 of the transistor T1 and the gate G2 of the transistor T2 are configured to receive the word line signal WL0 from the word line 102. In other words, the gate G1 of the transistor T1 and the gate G2 of the transistor T2 are configured to receive the same word line signal WL0 from the word line 102. Therefore, the transistor T1 and the transistor T2 are turned on or turned off simultaneously in response to the word line signal WL0 from the word line 102. In view of the above, since the reading path of the memory cell 110 of the memory device 100 increases to be two transistors T1, T2, the speed of the memory device 100 enhances.

In some embodiments, the gates of the transistor T1 and the transistor T2 are located on different layers. For example, the memory cell 110 adopts a complementary Field Effect Transistor (CFET) structure including an N-typed FET and a P-typed FET which is vertically arranged with the N-typed FET, but the CFET structure used in the memory cell 110 includes two N-typed FETs which are vertically arranged with each other. Therefore, the gate of one of the two N-typed FETs is located on a first layer, and the gate of the other of the two N-typed FETs is located on a second layer which is different from the first layer. In various embodiments, types of the transistor T1 and the transistor T2 are the same. For example, the transistor T1 and the transistor T2 are all N-typed FETs. In view of the above, the gate of the transistor T1 is located on the first layer, and the gate of the transistor T2 is located on the second layer which is different from the first layer. In other words, the gates of the transistor T1 and the transistor T2 which are vertically arranged with each other are located on different layers.

In some embodiments, the memory cell 120 includes a transistor T3 and a transistor T4. The transistor T4 is coupled to the transistor T3 in parallel. For example, the upper terminal of the transistor T3 and the upper terminal of the transistor T4 are coupled to the bit lines 103, and the lower terminal of the transistor T3 and the lower terminal of the transistor T4 are floating.

For illustration of operation, the upper terminal of the transistor T3 and the upper terminal of the transistor T4 are configured to receive bit line signals BL1 from the bit lines 103. In other words, the upper terminal of the transistor T3 and the upper terminal of the transistor T4 are configured to receive the same bit line signals BL1 from the bit lines 103. The voltage level stored in the transistor T3 and the voltage level stored in the transistor T4 are the same since the upper terminal of the transistor T3 and the upper terminal of the transistor T4 are configured to receive the same bit line signals BL1 from the bit lines 103. For example, the voltage level stored in the transistor T3 is the low voltage level representing logic "0", and the voltage level stored in the transistor T4 is also the low voltage level representing logic "0". In various embodiments, the voltage level stored in the transistor T3 is the high voltage level representing logic "1", and the voltage level stored in the transistor T4 is also the high voltage level representing logic "1".

As illustratively shown in the embodiments of FIG. 1, the voltage level stored in the transistor T1 and the voltage level stored in the transistor T2 are the same, and the voltage level stored in the transistor T3 and the voltage level stored in the transistor T4 are the same. In various embodiments, the voltage level stored in the transistor T1 and the voltage level stored in the transistor T3 are different, and the voltage level stored in the transistor T1 and the voltage level stored in the transistor T4 are different. In addition, the voltage level stored in the transistor T2 and the voltage level stored in the transistor T3 are different, and the voltage level stored in the transistor T2 and the voltage level stored in the transistor T4 are different. In view of the above, the voltage levels stored in the transistors T1, T2 are different from the voltage levels stored in the transistors T3, T4.

For illustration of operation, the upper terminal of the transistor T1 and the upper terminal of the transistor T2 are configured to receive the bit line signals BL0 from the bit lines 101, and the upper terminal of the transistor T3 and the upper terminal of the transistor T4 are configured to receive the bit line signals BL1 being different from the bit line signals BL0.

As illustratively shown in the embodiments of FIG. 1, the lower terminal of the transistor T1 and the lower terminal of the transistor T2 are configured to receive the ground signal VSS from the ground GND, and the lower terminal of the transistor T3 and the lower terminal of the transistor T4 are configured to receive the floating signal Vfloat. In other words, the lower terminal of the transistor T1 and the lower terminal of the transistor T2 are configured to receive the same ground signal VSS from the ground GND, and the lower terminal of the transistor T3 and the lower terminal of the transistor T4 are configured to receive the same floating signal Vfloat.

In some embodiments, gates of the transistor T3 and the transistor T4 are coupled to each other. For example, the gate G3 of the transistor T3 and the gate G4 of the transistor T4 are coupled to each other. In various embodiments, the gate G3 of the transistor T3 and the gate G4 of the transistor T4 are coupled to the word line 104.

For illustration of operation, the gate G3 of the transistor T3 and the gate G4 of the transistor T4 are configured to receive the word line signal WL1 from the word line 104. In other words, the gate G3 of the transistor T3 and the gate G4 of the transistor T4 are configured to receive the same word line signal WL1 from the word line 104. Therefore, the transistor T3 and the transistor T4 are turned on or turned off simultaneously in response to the word line signal WL1 from the word line 104. In view of the above, since the reading path of the memory cell 120 of the memory device 100 increases to be two transistors T3, T4, the speed of the memory device 100 enhances.

As illustratively shown in the embodiments of FIG. 1, the gate G1 of the transistor T1 and the gate G2 of the transistor T2 are configured to receive the word line signal WL0, and the gate G3 of the transistor T3 and the gate G4 of the transistor T4 are configured to receive the word line signal WL1 being different from the word line signal WL0.

In some embodiments, the gates of the transistor T3 and the transistor T4 are located on different layers. For example, the memory cell 120 also adopts the CFET structure including the N-typed FET and the P-typed FET which is vertically arranged with the N-typed FET, but the CFET structure used in the memory cell 120 includes two N-typed FETs which are vertically arranged with each other. Therefore, the gate of one of the two N-typed FETs is located on the first layer, and the gate of the other of the two N-typed FETs is located on the second layer which is different from the first layer. In various embodiments, types of the transistor T3 and the transistor T4 are the same. For example, the transistor T3 and the transistor T4 are all N-typed FETs. In view of the above, the gate of the transistor T3 is located on the first layer, and the gate of the transistor T4 is located on the second layer which is different from the first layer. In other words, the gates of the transistor T3 and the transistor T4 which are vertically arranged with each other are located on different layers.

In some embodiments, types of the transistor T1, the transistor T2, the transistor T3, and the transistor T4 are the same. For example, the transistor T1, the transistor T2, the transistor T3, and the transistor T4 are all N-typed FETs. In various embodiments, the transistor T1, the transistor T2, the transistor T3, and the transistor T4 are all P-typed FETs depending on actual requirements.

In various embodiments, the multiplier 130 is configured to output the voltage level stored in the transistor T1 and the transistor T2 of the memory cell 110, or the multiplier 130 is configured to output the voltage level stored in the transistor T3 and the transistor T4 of the memory cell 120.

As illustratively shown in the embodiments of FIG. 1, the memory cell 110 includes at least two transistors T1, T2, and the memory cell 120 includes at least two transistors T3, T4. The at least two transistors T1, T2 are coupled to each other in parallel, the gates G1, G2 of the at least two transistors T1, T2 are coupled to each other, and the gates G1, G2 of the at least two transistors T1, T2 are located on different layers. The at least two transistors T3, T4 are coupled to each other in parallel, the gates G3, G4 of the at least two transistors T3, T4 are coupled to each other, and the gates G3, G4 of the at least two transistors T3, T4 are located on different layers.

In some embodiments, the gate of one of the at least two transistors T1, T2 and the gate of one of the at least two transistors T3, T4 are located on the same layer. For example, the gate G1 of the transistor T1 and the gate G3 of the transistor T3 are located on the same layer. In various embodiments, the gate of another one of the at least two transistors T1, T2 and the gate of another one of the at least two transistors T3, T4 are located on the same layer. For example, the gate G2 of the transistor T2 and the gate G4 of the transistor T4 are located on the same layer.

In some embodiments, types of the at least two transistors T1, T2 and the at least two transistors T3, T4 are the same. For example, the at least two transistors T1, T2 and the at least two transistors T3, T4 are all N-typed FETs. In various embodiments, the at least two transistors T1, T2 and the at least two transistors T3, T4 are all P-typed FETs depending on accrual requirements.

In some embodiments, the gate of one of the at least two transistors T1, T2 and the gate of another one of the at least two transistors T3, T4 are located on different layers. For example, the gate G1 of the transistor T1 and the gate G4 of the transistor T4 are located on different layers. In various embodiments, the gate of another one of the at least two transistors T1, T2 and the gate of one of the at least two transistors T3, T4 are located on different layers. For example, the gate G2 of the transistor T2 and the gate G3 of the transistor T3 are located on different layers.

The configurations of FIG. 1 are given for illustrative purposes. Various implements are within the contemplated scope of the present disclosure.

Figure 2A:
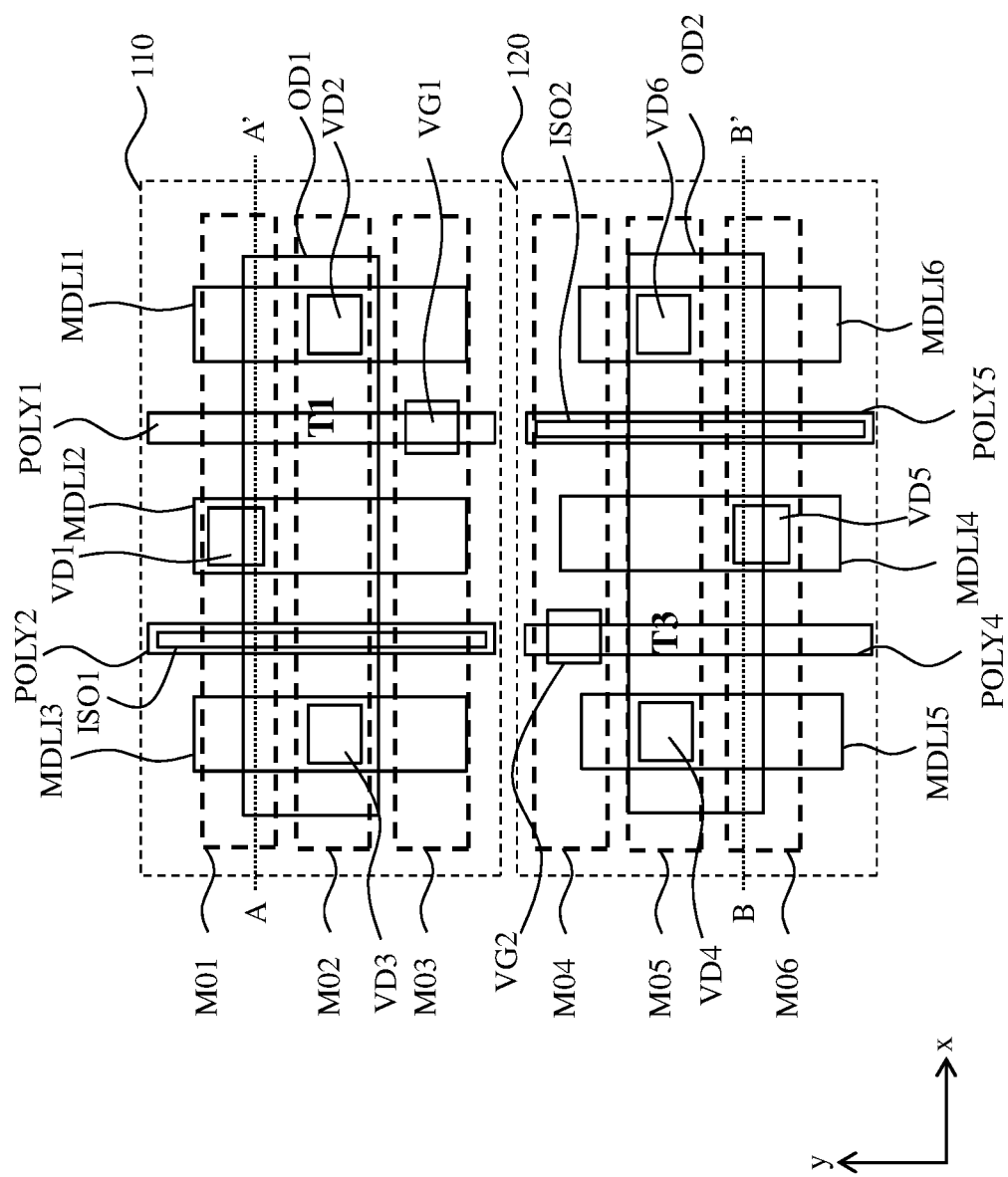
FIG. 2A is a schematic layout diagram of part of a memory device corresponding to FIG. 1, in accordance with some embodiments of the present disclosure.
Figure 2B:
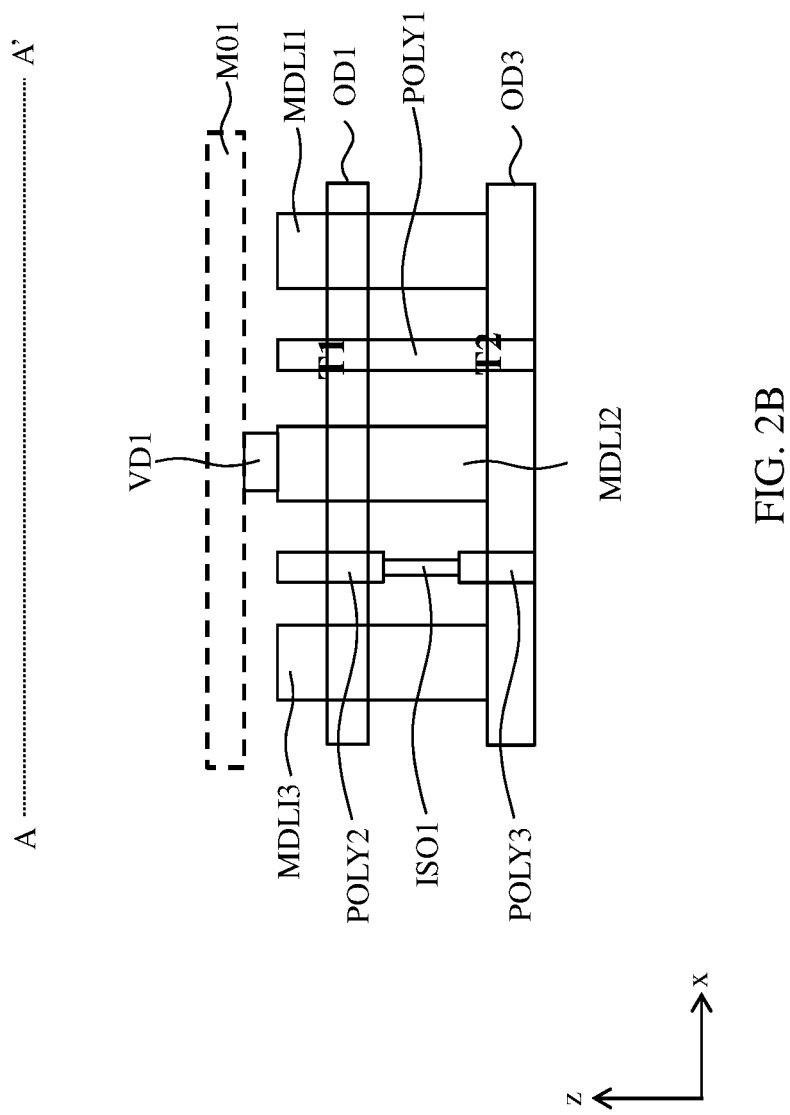
FIGS. 2B-2C are schematic diagrams in cross-sectional view of part of the memory device corresponding to FIG. 2A, in accordance with some embodiments of the present disclosure.
Figure 2C:
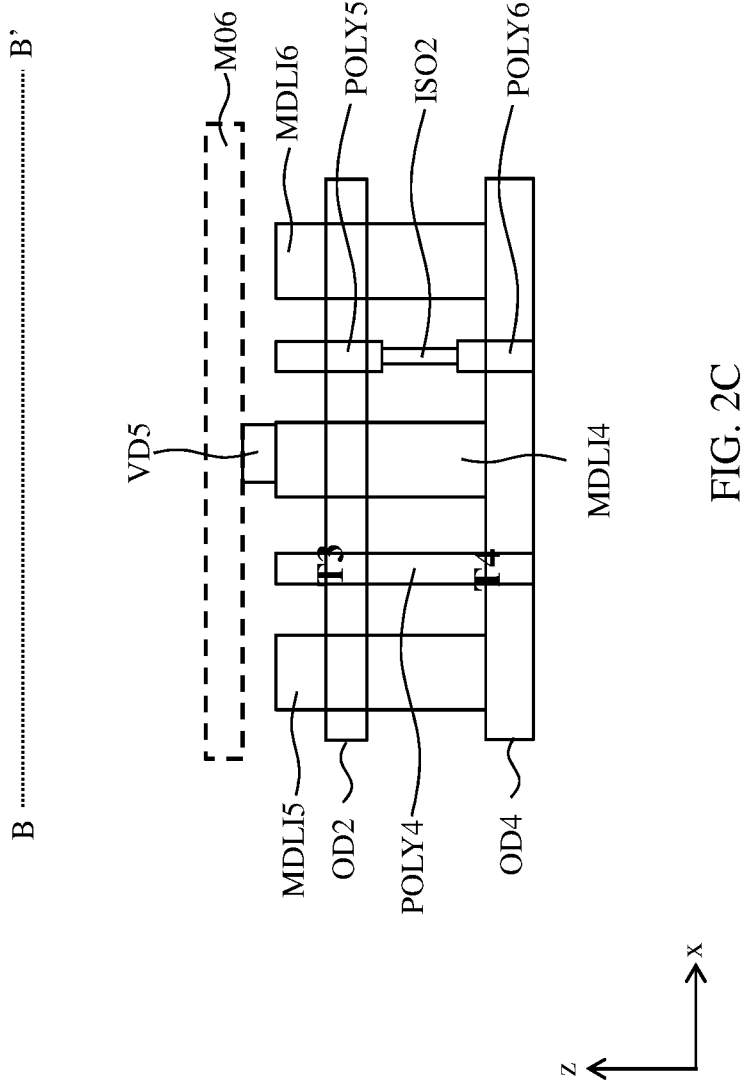

Reference is now made to FIGS. 2A-2C. FIG. 2A is a schematic layout diagram of part of a memory device, and FIGS. 2B-2C are schematic diagrams in cross-sectional view of part of the memory device corresponding to FIG. 2A, in accordance with some embodiments of the present disclosure. With respect to the embodiments of FIG. 1, like elements in FIGS. 2A-2C are designated with the same reference numbers for ease of understanding. The specific operations of similar elements, which are already discussed in detail in above paragraphs, are omitted herein for the sake of brevity.

For illustration, the memory device 100 includes active area (e.g., also referred to as oxide diffusions (OD)) OD1-OD4, the active areas OD3-OD4 overlapping the active areas OD1-OD2 respectively and shown in the cross-sectional view of the memory device 100 in FIGS. 2B-2C. The memory device 100 further includes metal-liked definition (e.g., also referred to as MD) local interconnections MDLI1-MDLI6, and polysilicon structures (e.g., also referred to as gate structures) PLOY 1-POLY6, in which the polysilicon structure POLY3 and POLY6 are shown in the cross-sectional view of the memory device 100 in FIGS. 2B-2C. The memory device 100 also includes vias VD1-VD6 and VG1-VG2 and conductive lines M01-M06. In some embodiments, the conductive lines M01-M06 are arranged in a first semiconductor layer, and the active areas OD1-OD2 and the polysilicon structure POLY2 and POLY5 are arranged in a second semiconductor layer below the first semiconductor layer. The vias VD1-VD6 and VG1-VG2 are arranged between the first and second semiconductor layers. The active areas OD3-OD4 are arranged in a third semiconductor layer below the second semiconductor layer. In some embodiments, the MD local interconnections MDLI1-MDLI6 and the polysilicon structures POLY1 and POLY4 extend from the second semiconductor layer to the third semiconductor layer along z direction. In some embodiments, the conductive lines M01-M06 are included in a front side metal routing for signals in the memory device 100.

In some embodiments, the polysilicon structure POLY1 corresponds to the gates G1-G2 of the transistors T1-T2, the MD local interconnections MDLI1 corresponds to the lower terminals of the transistors T1-T2, and the MD local interconnection MDLI2 corresponds to the upper terminals of the transistors T1-T2. The polysilicon structure POLY4 corresponds to the gates G3-G4 of the transistors T3-T4, the MD local interconnection MDLI4 corresponds to the upper terminals of the transistors T3-T4, and the MD local interconnection MDLI5 corresponds to the lower terminals of the transistors T3-T4.

In some embodiments, the conductive line M01 corresponds to the bit line 101, the conductive line M02 is coupled to the ground, and the conductive line M03 corresponds to the word line 102. The conductive line M04 corresponds to the word line 104, the conductive line M05 is kept floating, and the conductive line M06 corresponds to the bit line 103.

For illustration, in the embodiments of FIGS. 2A-2C, the active areas OD1-OD4 extend in x direction. The active areas OD1 and OD3 are separated from the active areas OD2 and OD4 in y direction.

The polysilicon structures POLY1-POLY6 extend in y direction. In some embodiments, the polysilicon structure POLY1 is separated from the polysilicon structure POLY4 in y direction. Alternatively stated, the polysilicon structures POLY1 and POLY4 are staggered. For illustration, the polysilicon structures POLY1 and POLY2 cross the active area OD1 in the layout view. Similarly, the polysilicon structures POLY4 and POLY5 cross the active area OD2 in the layout view.

The MD local interconnections MDLI1-MDLI6 extend in y direction in the layout view. Specifically, the MD local interconnections MDLI1-MDLI3 cross the active area OD1, and the MD local interconnections MDLI4-MDLI6 cross the active area OD2.

The conductive lines M01-M06 extend in x direction and are separated from each other in y direction. In some embodiments, The via VD1 couples the MD local interconnection MDLI2 to the conductive line M01. The vias VD2 and VD3 couple the MD local interconnections MDLI1 and MDLI3 to the conductive line M02. The via VG1 couples the polysilicon structure POLY1 to the conductive line M03. The via VG2 couples the polysilicon structure POLY4 to the conductive line M04. The vias VD4 and VD6 couple the MD local interconnections MDLI5 and MDLI6 to the conductive line M05. The via VD5 couples the MD local interconnection MDLI4 to the conductive line M06.

With reference to FIG. 2B, the transistors T1-T2 share the polysilicon structure POLY1 and further share the MD local interconnections MDLI1-MDLI2.

Specifically, the MD local interconnections MDLI1-MDLI3 extends in z direction to overlap and to connect to portions of the active areas OD1 and OD3. The polysilicon structure POLY1 continuously extends in z direction to pass through the active areas OD1-OD2. The memory device 100 further includes an isolation structure ISO1 arranged between the polysilicon structure POLY2 and POLY3. In some embodiments, the isolation structure ISO1 is configured to electrically isolate the polysilicon structure POLY2 from the polysilicon structure POLY3.

With reference to FIG. 2C, the transistors T3-T4 share the polysilicon structure POLY4 and further share the MD local interconnections MDLI4-MDLI5.

Specifically, the MD local interconnections MDLI4-MDLI6 extends in z direction to overlap and to connect to portions of the active areas OD2 and OD4. The polysilicon structure POLY4 continuously extends in z direction to pass through the active areas OD1-OD2. The memory device 100 further includes an isolation structure ISO2 arranged between the polysilicon structure POLY5 and POLY6. In some embodiments, the isolation structure ISO2 is configured to electrically isolate the polysilicon structure POLY5 from the polysilicon structure POLY6.

Figure 2D:
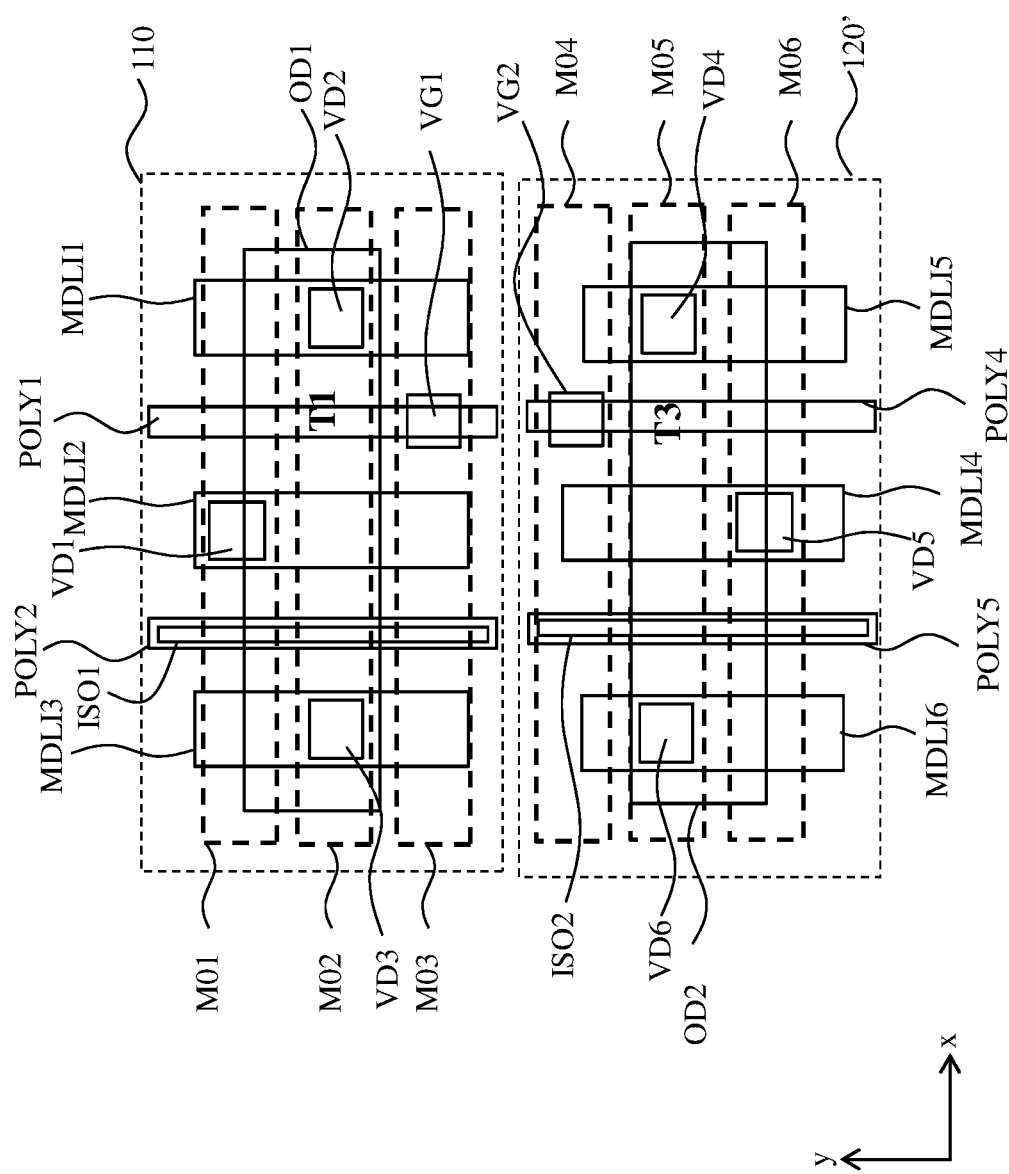
FIG. 2D is a schematic layout diagram of part of a memory device corresponding to FIG. 1, in accordance with some embodiments of the present disclosure.

Reference is now made to FIG. 2D. FIG. 2D is a schematic layout diagram of part of the memory device 100 corresponding to FIG. 1, in accordance with some embodiments of the present disclosure. With respect to the embodiments of FIGS. 1-2C, like elements in FIG. 2D are designated with the same reference numbers for ease of understanding.

Comparing the embodiments of FIG. 2D with FIG. 2A, the polysilicon structure POLY4 is aligned with the polysilicon structure POLY1 in a memory cell 120' along y direction. The MD local interconnection MDLI1 is aligned with the MD local interconnections MDL5 along y direction. The MD local interconnection MDLI3 is aligned with the MD local interconnections MDL6 along y direction.

Figure 2E:
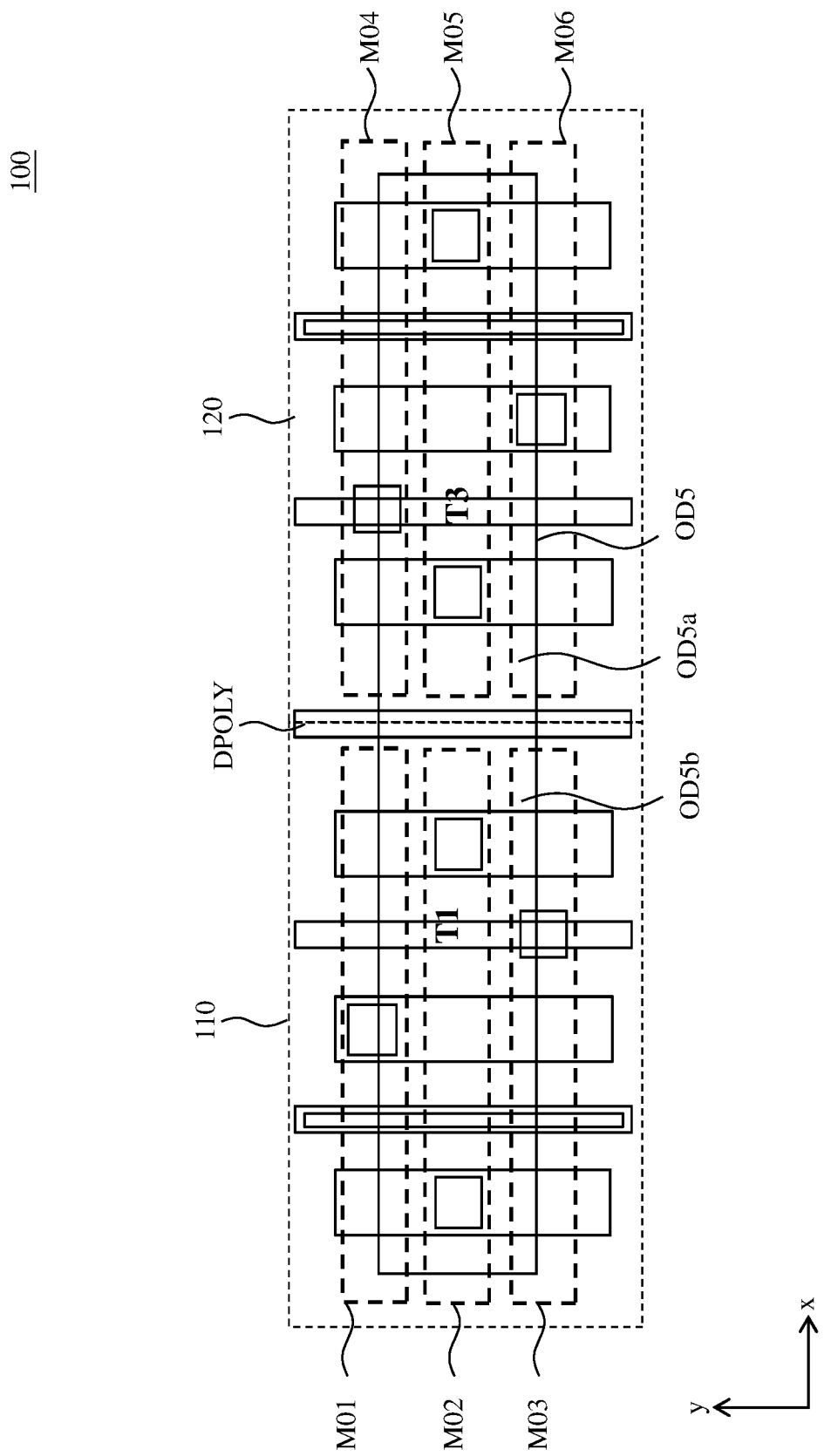
FIG. 2E is a schematic layout diagram of part of a memory device corresponding to FIG. 1, in accordance with some embodiments of the present disclosure.

Reference is now made to FIG. 2E. FIG. 2E is a schematic layout diagram of part of the memory device 100 corresponding to FIG. 1, in accordance with some embodiments of the present disclosure. With respect to the embodiments of FIGS. 1-2D, like elements in FIG. 2E are designated with the same reference numbers for ease of understanding.

Comparing the embodiments of FIG. 2E with FIG. 2A, instead of arranging the memory cells 110 and 120 along y direction, the memory cells 110 and 120 are placed adjacent with each other along x direction.

Specifically, for illustration, the memory device 100 in FIG. 2E further includes active areas OD5-OD6 extending across the memory cells 110 and 120. The active area OD5 overlaps the active area OD6. The active area OD5 is configured with respect to, for example, the active areas OD1 and OD2 that are in the second semiconductor layer. The active area OD6 is configured with respect to, for example, the active areas OD3 and OD4 that are in the third semiconductor layer. The memory device 100 of FIG. 2E also further includes a polysilicon structure DPOLY. In some embodiments, the polysilicon structure DPOLY is referred to as a dummy gate, in which in some embodiments, the "dummy" gates are referred to as being not electrically connected as the gates for MOS devices, having no function in the circuit. The polysilicon structure DPOLY electrically isolates a portion OD5$a$ of the active area OD5 from a portion OD5$b$ of the active area OD5, in which the portion OD5$a$ corresponds to the lower terminals of the transistors T3 and T4 and the portion OD5$b$ corresponds to the lower terminals of the transistors T1 and T2.

The configurations of FIGS. 2A-2E are given for illustrative purposes. Various implements are within the contemplated scope of the present disclosure. For example, in some embodiments, there are no isolation structures ISO1-ISO2 arranged between the polysilicon structure POLY2-POLY3 and POLY5-POLY6.

Figure 3:
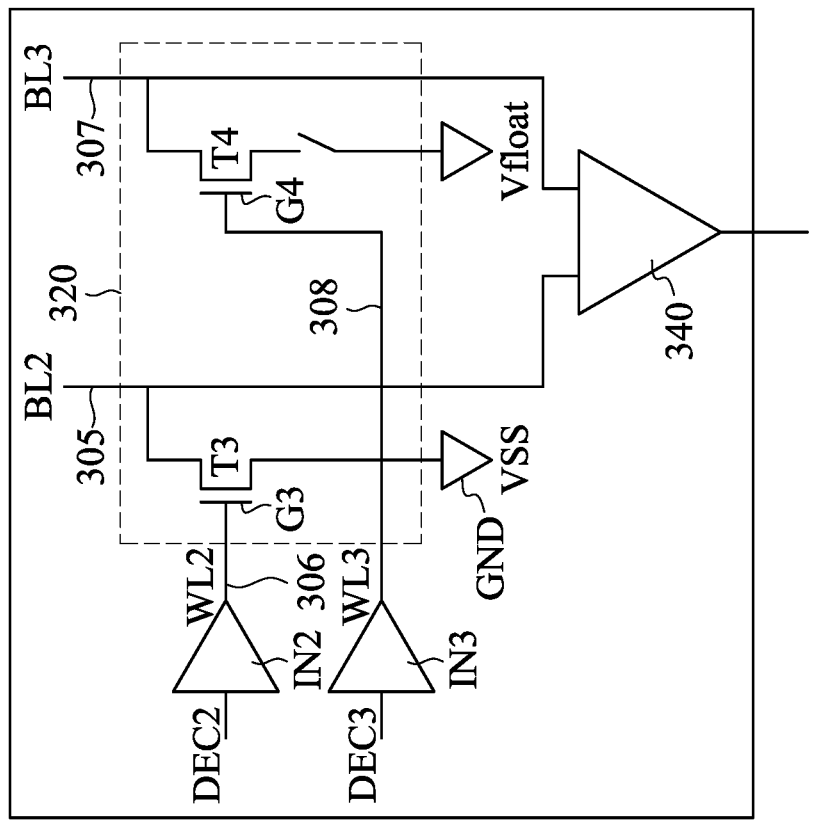
FIG. 3 is a schematic diagram of part of a memory device, in accordance with some embodiments of the present disclosure.
Figure 3:
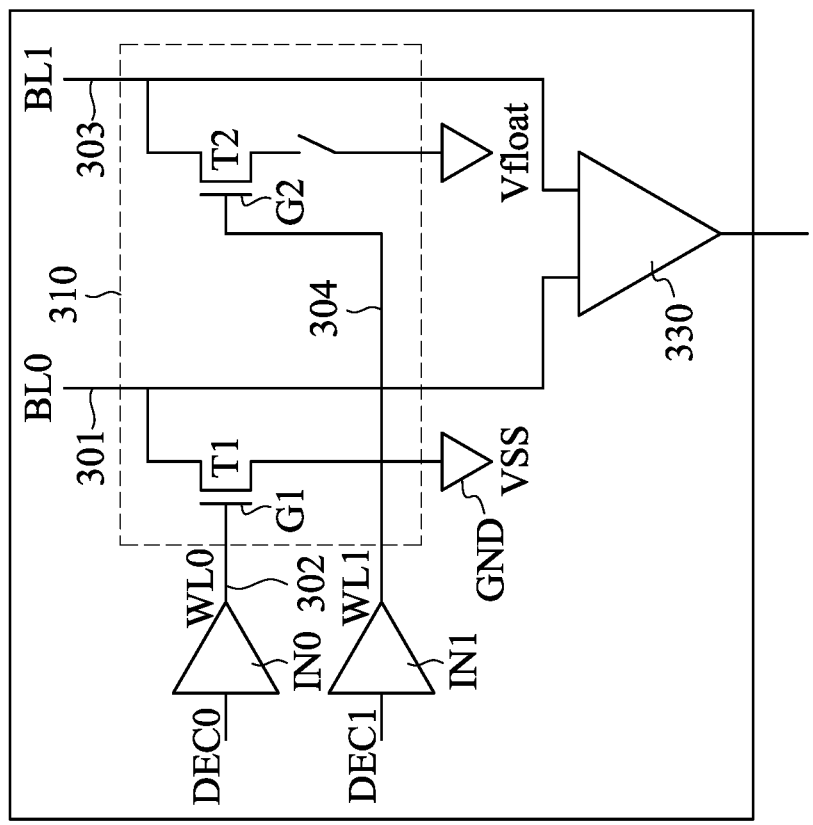

Reference is now made to FIG. 3. FIG. 3 is a schematic diagram of part of a memory device 300, in accordance with some embodiments of the present disclosure. For illustration, the memory device 300 includes an inverter IN0, an inverter IN1, a memory cell 310, a multiplexer 330, an inverter IN2, an inverter IN3, a memory cell 320, and a multiplexer 340.

In some embodiments, the inverter IN0 is coupled to the memory cell 310. The inverter IN1 is coupled to the memory cell 310. The multiplexer 330 is coupled to the memory cell 310. The inverter IN2 is coupled to the memory cell 320. The inverter IN3 is coupled to the memory cell 320. The multiplexer 340 is coupled to the memory cell 320.

In some embodiments, the memory cell 310 includes a transistor T1 and a transistor T2. The transistor T1 includes an upper terminal, a gate terminal G1, and a lower terminal. The transistor T2 includes an upper terminal, a gate terminal G2, and a lower terminal.

For illustration of operation, the upper terminal of the transistor T1 is configured to receive a bit line signal BL0 from a bit line 301. The upper terminal of the transistor T2 is configured to receive a bit line signal BL1 from a bit line 303. Therefore, the upper terminal of the transistor T1 and the upper terminal of the transistor T2 are configured to receive different bit line signals BL0, BL1 from different bit lines 301, 303. The voltage level stored in the transistor T1 and the voltage level stored in the transistor T2 are different since the upper terminal of the transistor T1 and the upper terminal of the transistor T2 are configured to receive different bit line signals BL0, BL1 from different bit lines 301, 303. For example, the voltage level stored in the transistor T1 is the high voltage level representing logic "1", and the voltage level stored in the transistor T2 is the low voltage level representing logic "0". In various embodiments, the voltage level stored in the transistor T1 is the low voltage level representing logic "0", and the voltage level stored in the transistor T2 is the high voltage level representing logic "1".

For illustration of operation, the lower terminal of the transistor T1 is configured to receive the ground signal VSS from the ground GND. The lower terminal of the transistor T2 is configured to receive the floating signal Vfloat. In other words, the lower terminal of the transistor T1 and the lower terminal of the transistor T2 are configured to receive different signals.

In some embodiments, gates of the transistor T1 and the transistor T2 are coupled to different word lines 302, 304. For example, the gate G1 of the transistor T1 is coupled to the word line 302, and the gate G2 of the transistor T2 is coupled to the word line 304.

For illustration of operation, the gate G1 of the transistor T1 and the gate G2 of the transistor T2 are configured to receive different word line signals WL0, WL1 from different word lines 302, 304. For example, the gate G1 of the transistor T1 is configured to receive the word line signal WL0 from the word line 302, and the gate G2 of the transistor T2 is configured to receive the word line signal WL1 from the word line 304. Therefore, the transistor T1 and the transistor T2 are turned on or turned off respectively in response to the word line signals WL0, WL1 from the word lines 302, 304.

In some embodiments, the gates G1, G2 of the transistors T1, T2 are located on different layers. For example, the memory cell 310 adopts the CFET structure including the N-typed FET and the P-typed FET which is vertically arranged with the N-typed FET, but the CFET structure used in the memory cell 310 includes two N-typed FETs which are vertically arranged with each other. Therefore, the gate of one of the two N-typed FETs is located on a first layer, and the gate of the other of the two N-typed FETs is located on a second layer which is different from the first layer. In various embodiments, types of the transistors T1, T2 are the same. For example, the transistors T1, T2 are all N-typed FETs.

In view of the above, the gate G1 of the transistor T1 is located on the first layer, and the gate G2 of the transistor T2 is located on the second layer which is different from the first layer. In other words, the gates G1, G2 of the transistors T1, T2 which are vertically arranged with each other are located on different layers. Therefore, by adopting the CFET structure including two N-typed FETs which are vertically arranged with each other, the gates G1, G2 of the transistors T1, T2 are located on different layers. In other words, the gates G1, G2 of the transistors T1, T2 are stacked together so as to save the area of the memory cell 310 with two separated gate signals WL0, WL1.

As illustratively shown in the embodiments of FIG. 3, the multiplexer 330 is coupled to the upper terminal of the transistor T1 and the upper terminal of the transistor T2. The multiplexer 330 is configured to select the voltage level stored in the transistor T1 of the memory cell 310, or the multiplexer 330 is configured to select the voltage level stored in the transistor T2 of the memory cell 310.

In some embodiments, the memory cell 320 includes a transistor T3 and a transistor T4. The transistor T3 includes an upper terminal, a gate terminal G3, and a lower terminal. The transistor T4 includes an upper terminal, a gate terminal G4, and a lower terminal.

For illustration of operation, the upper terminal of the transistor T3 is configured to receive a bit line signal BL2 from a bit line 305. The upper terminal of the transistor T4 is configured to receive a bit line signal BL3 from a bit line 307. Therefore, the upper terminal of the transistor T3 and the upper terminal of the transistor T4 are configured to receive different bit line signals BL2, BL3 from different bit lines 305, 307. The voltage level stored in the transistor T3 and the voltage level stored in the transistor T4 are different since the upper terminal of the transistor T3 and the upper terminal of the transistor T4 are configured to receive different bit line signals BL2, BL3 from different bit lines 305, 307. For example, the voltage level stored in the transistor T3 is the high voltage level representing logic "1", and the voltage level stored in the transistor T4 is the low voltage level representing logic "0". In various embodiments, the voltage level stored in the transistor T3 is the low voltage level representing logic "0", and the voltage level stored in the transistor T4 is the high voltage level representing logic "1".

As illustratively shown in the embodiments of FIG. 3, the voltage level stored in the transistor T1 and the voltage level stored in the transistor T3 are the same, and the voltage level stored in the transistor T2 and the voltage level stored in the transistor T4 are the same. The voltage level stored in the transistor T1 and the voltage level stored in the transistor T4 are different. The voltage level stored in the transistor T2 and the voltage level stored in the transistor T3 are different. In view of the above, the voltage levels stored in the transistors T1, T3 are different from the voltage levels stored in the transistors T2, T4.

As illustratively shown in the embodiments of FIG. 3, the upper terminal of the transistor T1 is configured to receive the bit line signal BL0 from the bit line 301, the upper terminal of the transistor T2 is configured to receive the bit line signal BL1 from the bit line 303, the upper terminal of the transistor T3 is configured to receive the bit line signal BL2 from the bit line 305, and the upper terminal of the transistor T4 is configured to receive the bit line signal BL3 from the bit line 307. In view of the above, the upper terminal of the transistor T1, the upper terminal of the transistor T2, the upper terminal of the transistor T3, and the upper terminal of the transistor T4 are configured to receive different bit line signals BL0~BL3 from different bit lines 301, 303, 305, 307.

For illustration of operation, the lower terminal of the transistor T1 and the lower terminal of the transistor T3 are configured to receive the ground signal VSS from the ground GND. The lower terminal of the transistor T2 and the lower terminal of the transistor T4 are configured to receive the floating signal Vfloat. In other words, the lower terminals of the transistors T1, T3 and the lower terminals of the transistors T2, T4 are configured to receive different signals.

In some embodiments, gates of the transistor T3 and the transistor T4 are coupled to different word lines 306, 308. For example, the gate G3 of the transistor T3 is coupled to the word line 306, and the gate G4 of the transistor T4 is coupled to the word line 308.

For illustration of operation, the gate G3 of the transistor T3 and the gate G4 of the transistor T4 are configured to receive different word line signals WL2, WL3 from different word lines 306, 308. For example, the gate G3 of the transistor T3 is configured to receive the word line signal WL2 from the word line 306, and the gate G4 of the transistor T4 is configured to receive the word line signal WL3 from the word line 308. Therefore, the transistor T3 and the transistor T4 are turned on or turned off respectively in response to the word line signals WL2, WL3 from the word lines 306, 308.

As illustratively shown in the embodiments of FIG. 3, the gate G1 of the transistor T1 is configured to receive the word line signal WL0 from the word line 302, the gate G2 of the transistor T2 is configured to receive the word line signal WL1 from the word line 304, the gate G3 of the transistor T3 is configured to receive the word line signal WL2 from the word line 306, and the gate G4 of the transistor T4 is configured to receive the word line signal WL3 from the word line 308. In view of the above, the gate G1 of the transistor T1, the gate G2 of the transistor T2, the gate G3 of the transistor T3, and the gate G4 of the transistor T4 are configured to receive different word line signals WL0~WL3 from different word lines 302, 304, 306, 308.

In some embodiments, the gates G3, G4 of the transistors T3, T4 are located on different layers. For example, the memory cell 320 adopts the CFET structure including the N-typed FET and the P-typed FET which is vertically arranged with the N-typed FET, but the CFET structure used in the memory cell 320 includes two N-typed FETs which are vertically arranged with each other. Therefore, the gate of one of the two N-typed FETs is located on the first layer, and the gate of the other of the two N-typed FETs is located on the second layer which is different from the first layer. In various embodiments, types of the transistors T3, T4 are the same. For example, the transistors T3, T4 are all N-typed FETs.

In view of the above, the gate G3 of the transistor T3 is located on the first layer, and the gate G4 of the transistor T4 is located on the second layer which is different from the first layer. In other words, the gates G3, G4 of the transistors T3, T4 which are vertically arranged with each other are located on different layers. Therefore, by adopting the CFET structure including two N-typed FETs which are vertically arranged with each other, the gates G3, G4 of the transistors T3, T4 are located on different layers. In other words, the gates G3, G4 of the transistors T3, T4 are stacked together so as to save the area of the memory cell 320 with two separated gate signals WL2, WL3.

In some embodiments, types of the transistor T1, the transistor T2, the transistor T3, and the transistor T4 are the same. For example, the transistor T1, the transistor T2, the transistor T3, and the transistor T4 are all N-typed FETs. In various embodiments, the transistor T1, the transistor T2, the transistor T3, and the transistor T4 are all P-typed FETs depending on actual requirements.

As illustratively shown in the embodiments of FIG. 3, the multiplexer 340 is coupled to the upper terminal of the transistor T3 and the upper terminal of the transistor T4. The multiplexer 340 is configured to select the voltage level stored in the transistor T3 of the memory cell 320, or the multiplexer 340 is configured to select the voltage level stored in the transistor T4 of the memory cell 320.

The configurations of FIG. 3 are given for illustrative purposes. Various implements are within the contemplated scope of the present disclosure.

Figure 4A:
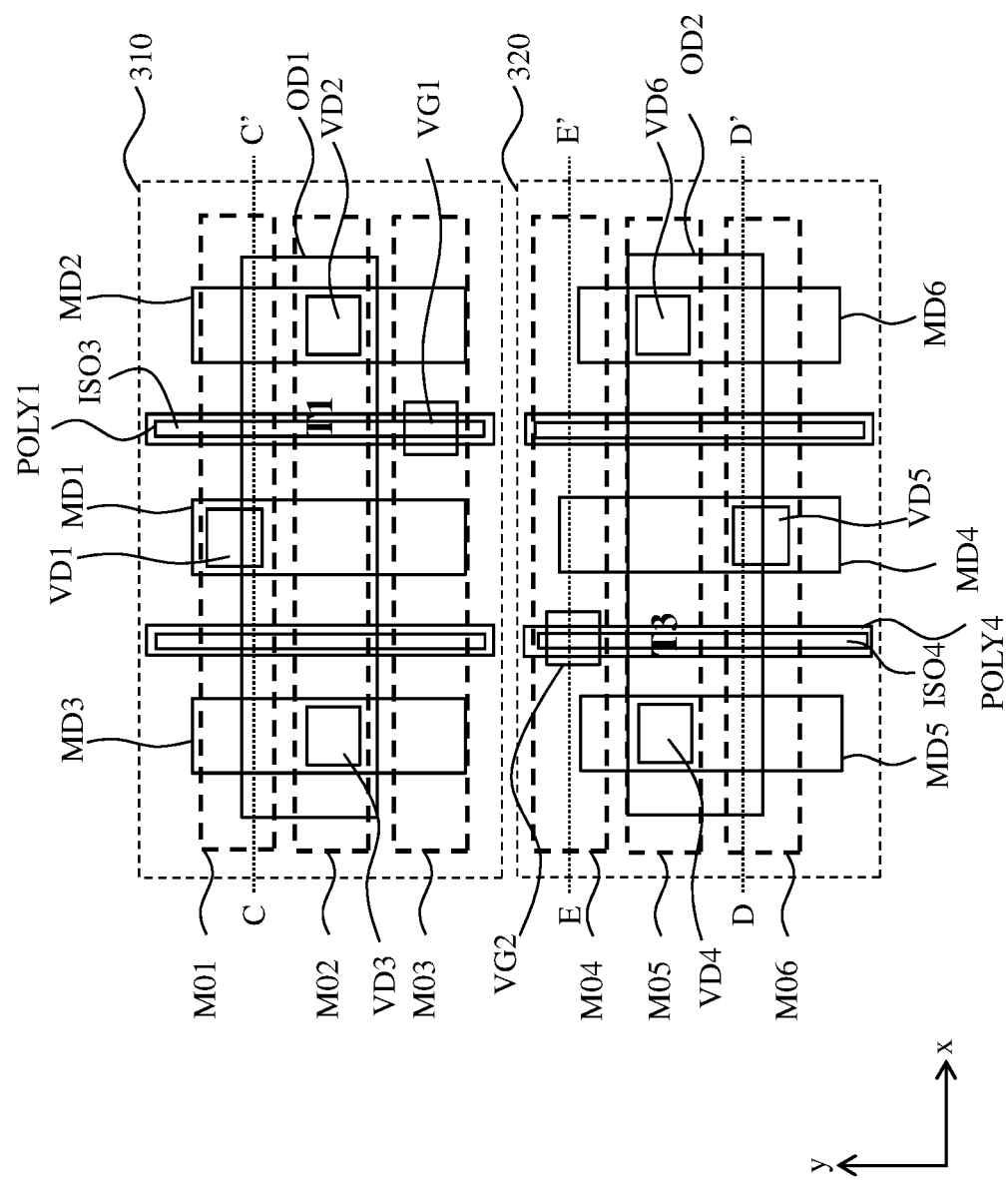
FIG. 4A is a schematic layout diagram of part of a memory device corresponding to FIG. 3, in accordance with some embodiments of the present disclosure.

Reference is now made to FIGS. 4A-4D. FIG. 4A is a schematic layout diagram of part of the memory device 300 corresponding to FIG. 3, and FIGS. 4B-4D are schematic diagrams in cross-sectional view of part of the memory device corresponding to FIG. 4A, in accordance with some embodiments of the present disclosure. With respect to the embodiments of FIGS. 1-2E, like elements in FIGS. 4A-4D are designated with the same reference numbers for ease of understanding.

For illustration, the memory device 300 includes memory cells 310 and 320. In some embodiments, the memory cell 310 is configured with respect to, for example, the memory cell 110. The memory cell 320 is configured with respect to, for example, the memory cell 120.

Figure 4B:
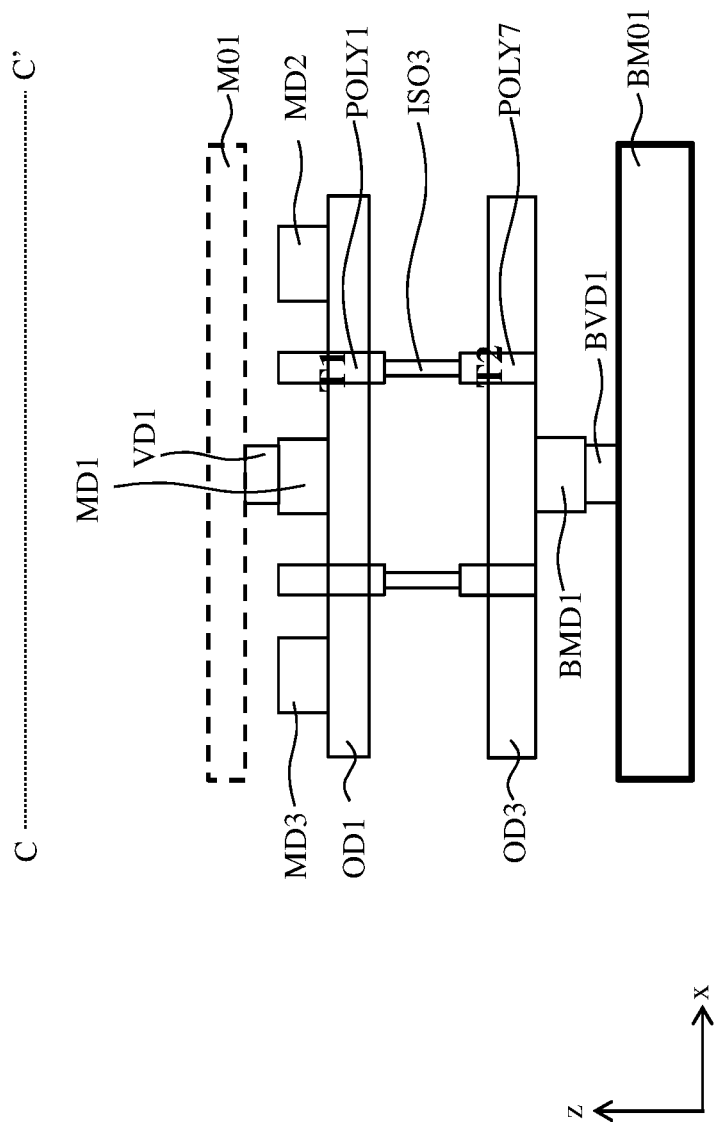
FIGS. 4B-4D are schematic diagrams in cross-sectional view of part of the memory device corresponding to FIG. 4A, in accordance with some embodiments of the present disclosure.

Compared with the embodiments with FIG. 2A, as illustratively shown in FIGS. 4A-4B, the polysilicon structure POLY1 is electrically isolated from a polysilicon structure POLY7 by an isolation structure ISO3 arranged therebetween. In some embodiments, the polysilicon structure POLY7 corresponds to the gate G2 of the transistor T2.

Furthermore, instead of having the MD local interconnections MDLI1-MDLI3 connecting to both of the active areas OD1 and OD3, the memory device 300 includes metal-liked definitions MD1-MD3. Specifically, the metal-liked definitions MD1-MD3 are disposed above the active area OD1 and connect to the active area OD1. The metal-liked definition MD1 corresponds to the upper terminal of the transistor T1 and is coupled to the conductive line M01 through the via VD1 disposed thereon. The metal-liked definitions MD2 corresponds to the lower terminal of the transistor T1 and is coupled to the conductive line M02 through the via VD2 diposed thereon and further to the metal-liked definition MD3 by the via VD3 disposed on the metal-liked definition MD3.

As shown in FIG. 4B showing a cross-sectional view of part of the memory device 300 along a line CC', the memory device 300 further includes a backside metal-liked definition BMD1 arranged below the active area OD3 and configured to couple the active area OD3 to a backside conductive line BM01 by a backside via BVD1. In some embodiments, the backside metal-liked definition BMD1 corresponds to the upper terminal of the transistor T2 and the backside conductive line BM01 corresponds to the bit line 303.

In some embodiments, the memory device 300 further includes another backside metal-liked definition, corresponding to the lower terminal of the transistor T2 and arranged below the active area OD3, being coupled to another backside conductive line configured with respect to, for example, the backside conductive line BM01 by another backside via, in which the another backside conductive line is kept floating.

Figure 4C:
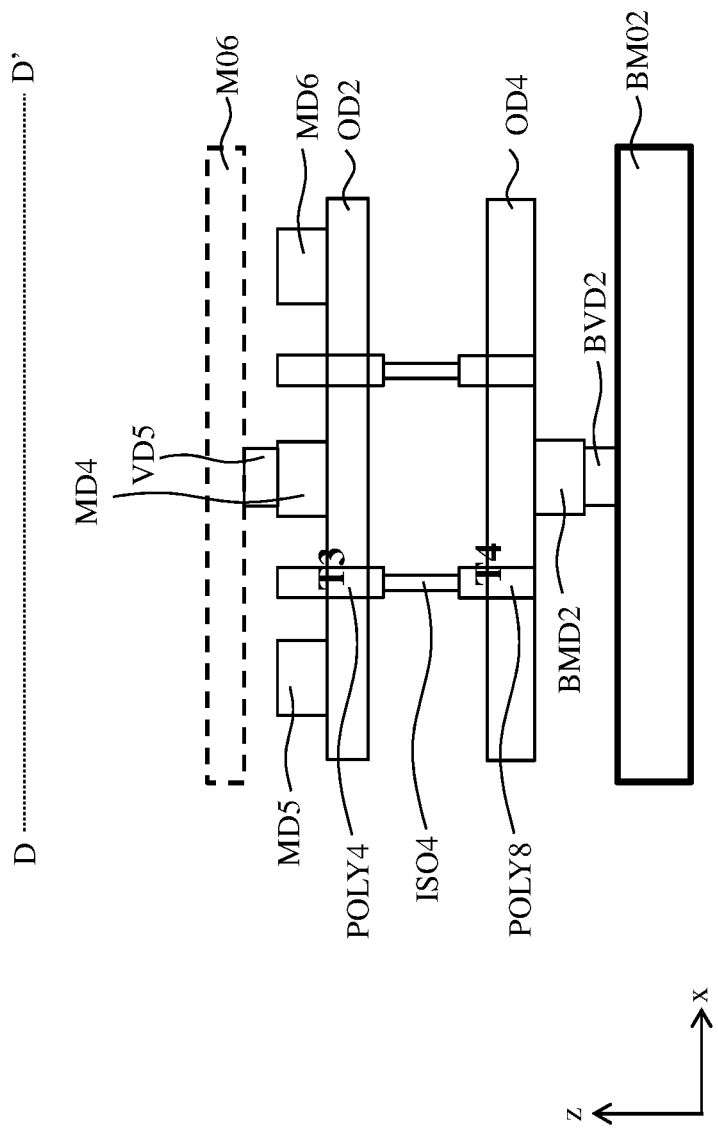

Similarly, as shown in FIGS. 4A and 4C, compared with the embodiments with FIG. 2A, the polysilicon structure POLY4 is electrically isolated from a polysilicon structure POLY8 by an isolation structure ISO4 arranged therebetween. In some embodiments, the polysilicon structure POLY8 corresponds to the gate G4 of the transistor T4.

Furthermore, instead of having the MD local interconnections MDLI4-MDLI5 connecting to both of the active areas OD2 and OD4, the memory device 300 includes metal-liked definitions MD4-MD6. Specifically, the metal-liked definitions MD4-MD6 are disposed above the active area OD2 and connect to the active area OD2. The metal-liked definition MD4 corresponds to the upper terminal of the transistor T3 and is coupled to the conductive line M06 through the via VD5 disposed thereon. The metal-liked definitions MD5 corresponds to the lower terminal of the transistor T3 and is coupled to the conductive line M05 through the via VD4 disposed thereon and further to the metal-liked definition MD6 by the via VD6 disposed on the metal-liked definition MD6.

As shown in FIG. 4C showing a cross-sectional view of part of the memory device 300 along a line DD', the memory device 300 further includes a backside metal-liked definition BMD2 arranged below the active area OD4 and configured to couple the active area OD4 to a backside conductive line BM02 by a backside via BVD2. In some embodiments, the backside metal-liked definition BMD2 corresponds to the upper terminal of the transistor T4 and the backside conductive line BM02 corresponds to the bit line 307.

In some embodiments, the memory device 300 further includes another backside metal-liked definition, corresponding to the lower terminal of the transistor T4 and arranged below the active area OD4, being coupled to another backside conductive line configured with respect to, for example, the backside conductive line BM01 by another backside via, in which the another backside conductive line is kept floating.

Figure 4D:
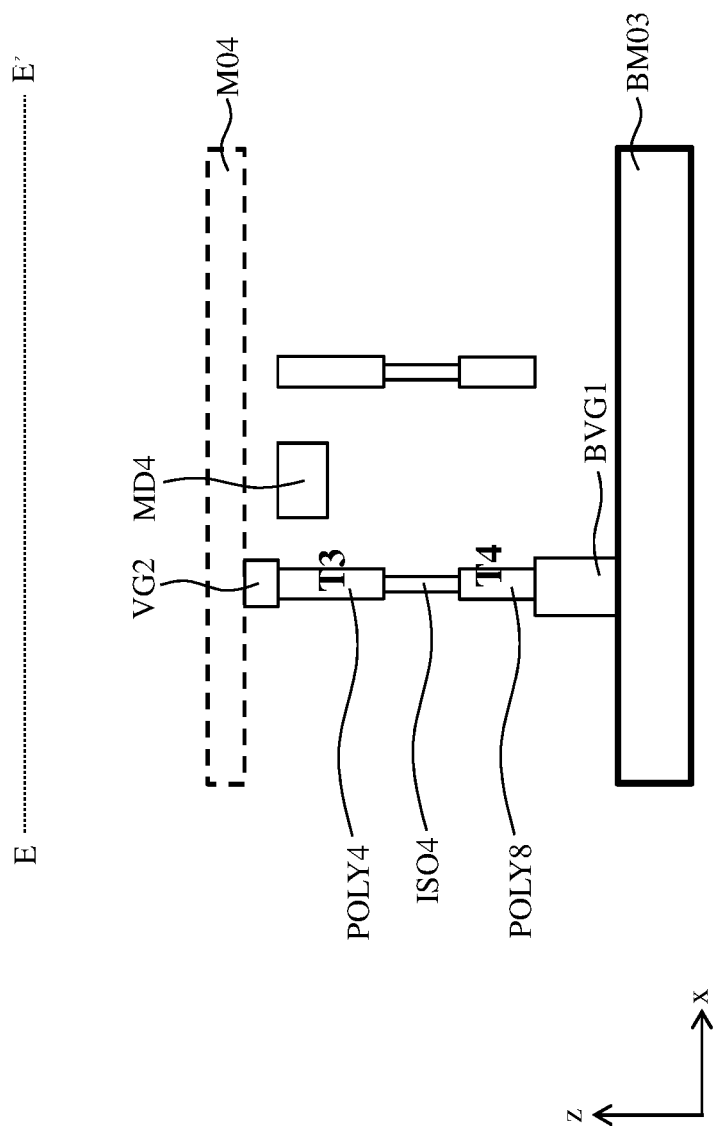

With reference to FIG. 4D, a cross-sectional view of part of the memory device 300 along a line EE' illustrates that the memory device 300 further includes a backside via BVG1 coupled between the polysilicon structure POLY8 to a backside conductive line BM03 configured with respect to, for example, the backside conductive line BM01. In some embodiments, the backside conductive line BM03 corresponds to the word line 308 of FIG. 3.

Similarly, the memory device 300 further includes another backside via, configured with respect to, for example, the backside via BVG1, coupled between the polysilicon structure POLY7 to another backside conductive line configured with respect to, for example, the backside conductive line BM03. In some embodiments, the another backside conductive line corresponds to the word line 304 of FIG. 3.

In some embodiments, the active semiconductor device, for example, the transistors T1-T4 of FIGS. 3-4D are formed on a substrate (not shown) in a front side process. After the front side process is complete, the memory device 300 is flipped upside down, such that a backside surface of the substrate faces upwards. The substrate is further thinned down and removed. In some embodiments, thinning is accomplished by a CMP process, a grinding process, or the like. Accordingly, backside process is performed to form structures on the backside of the memory device 300.

The configurations of FIGS. 4A-4D are given for illustrative purposes. Various implements are within the contemplated scope of the present disclosure. For example, in some embodiments, the memory cell 320 is configured with respect to, for example, the memory cell 120' shown in FIG. 2D in which the polysilicon structures POLY4 and POLY8 are aligned in y direction with the polysilicon structures POLY1 and POLY7.

In some embodiments, the memory cell 320 is arranged adjacent to the memory cell 310 in by configurations similar to that shown in FIG. 2E. The configurations of are similar, and hence, the repetitious descriptions are omitted here.

Figure 5:
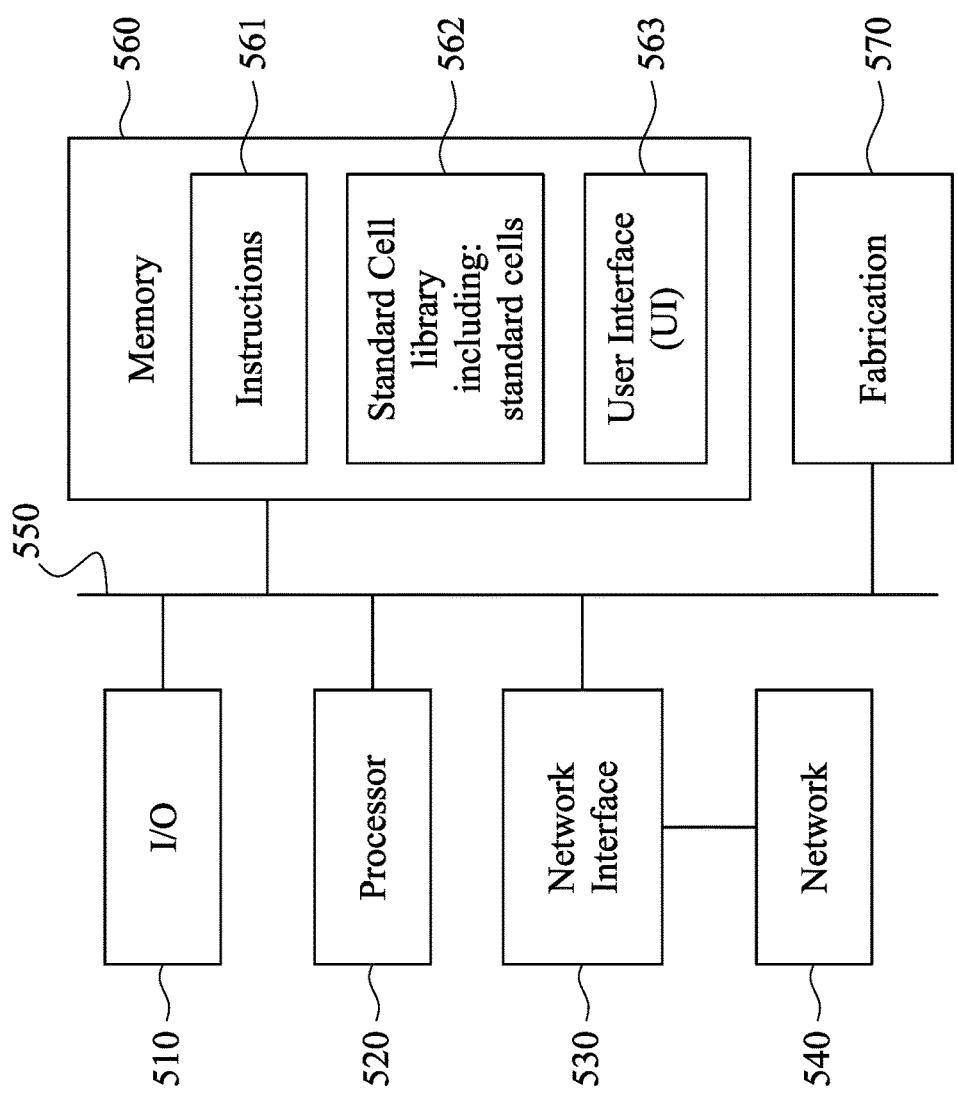
FIG. 5 is a block diagram of a system for designing the integrated circuit layout design, in accordance with some embodiments of the present disclosure.

Reference is now made to FIG. 5. FIG. 5 is a block diagram of an electronic design automation (EDA) system 500 for designing the integrated circuit layout design, in accordance with some embodiments of the present disclosure. In some embodiments, EDA system 500 includes an APR system.

In some embodiments, EDA system 500 is a general purpose computing device including a hardware processor 520 and a non-transitory, computer-readable storage medium 560. Storage medium 560, amongst other things, is encoded with, i.e., stores, computer program code (instructions) 561, i.e., a set of executable instructions. Execution of instructions 561 by hardware processor 520 represents (at least in part) an EDA tool which implements a portion or all of a method to manufacturing the memory devices 100 and 300 depicted in FIGS. 1-4D.

The processor 520 is electrically coupled to computer-readable storage medium 560 via a bus 550. The processor 520 is also electrically coupled to an I/O interface 510 and a fabrication tool 570 by bus 550. A network interface 530 is also electrically connected to processor 520 via bus 550. Network interface 530 is connected to a network 540, so that processor 520 and computer-readable storage medium 560 are capable of connecting to external elements via network 540. The processor 520 is configured to execute computer program code 561 encoded in computer-readable storage medium 560 in order to cause EDA system 500 to be usable for performing a portion or all of the noted processes and/or methods. In one or more embodiments, processor 520 is a central processing unit (CPU), a multi-processor, a distributed processing system, an application specific integrated circuit (ASIC), and/or a suitable processing unit.

In one or more embodiments, computer-readable storage medium 560 is an electronic, magnetic, optical, electromagnetic, infrared, and/or a semiconductor system (or apparatus or device). For example, computer-readable storage medium 560 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 560 includes a compact disk-read only memory (CD-ROM), a compact disk-read/write (CD-R/W), and/or a digital video disc (DVD).

In one or more embodiments, storage medium 560 stores computer program code 561 configured to cause EDA system 500 (where such execution represents (at least in part) the EDA tool) to be usable for performing a portion or all of the noted processes and/or methods. In one or more embodiments, storage medium 560 also stores information which facilitates performing a portion or all of the noted processes and/or methods. In one or more embodiments, storage medium 560 stores library 562 of standard cells including such standard cells as disclosed herein, for example, the memory cells 110-120 and 310-320 discussed above with respect to FIGS. 2A, 2D, 2E and 4A.

EDA system 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 520.

EDA system 500 also includes network interface 530 coupled to processor 520. Network interface 530 allows EDA system 500 to communicate with network 540, to which one or more other computer systems are connected. Network interface 530 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 500.

EDA system 500 also includes the fabrication tool 570 coupled to processor 520. The fabrication tool 570 is configured to fabricate integrated circuits, e.g., the memory devices 100 and 300 illustrated in FIGS. 1 and 3, according to the design files processed by the processor 520.

EDA system 500 is configured to receive information through I/O interface 510. The information received through I/O interface 510 includes one or more of instructions, data, design rules, libraries of standard cells, and/or other parameters for processing by processor 520. The information is transferred to processor 520 via bus 550. EDA system 500 is configured to receive information related to a UI through I/O interface 510. The information is stored in computer-readable medium 560 as user interface (UI) 563.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 500. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, for example, one or more of an optical disk, such as a DVD, a magnetic disk, such as a hard disk, a semiconductor memory, such as a ROM, a RAM, a memory card, and the like.

Figure 6:
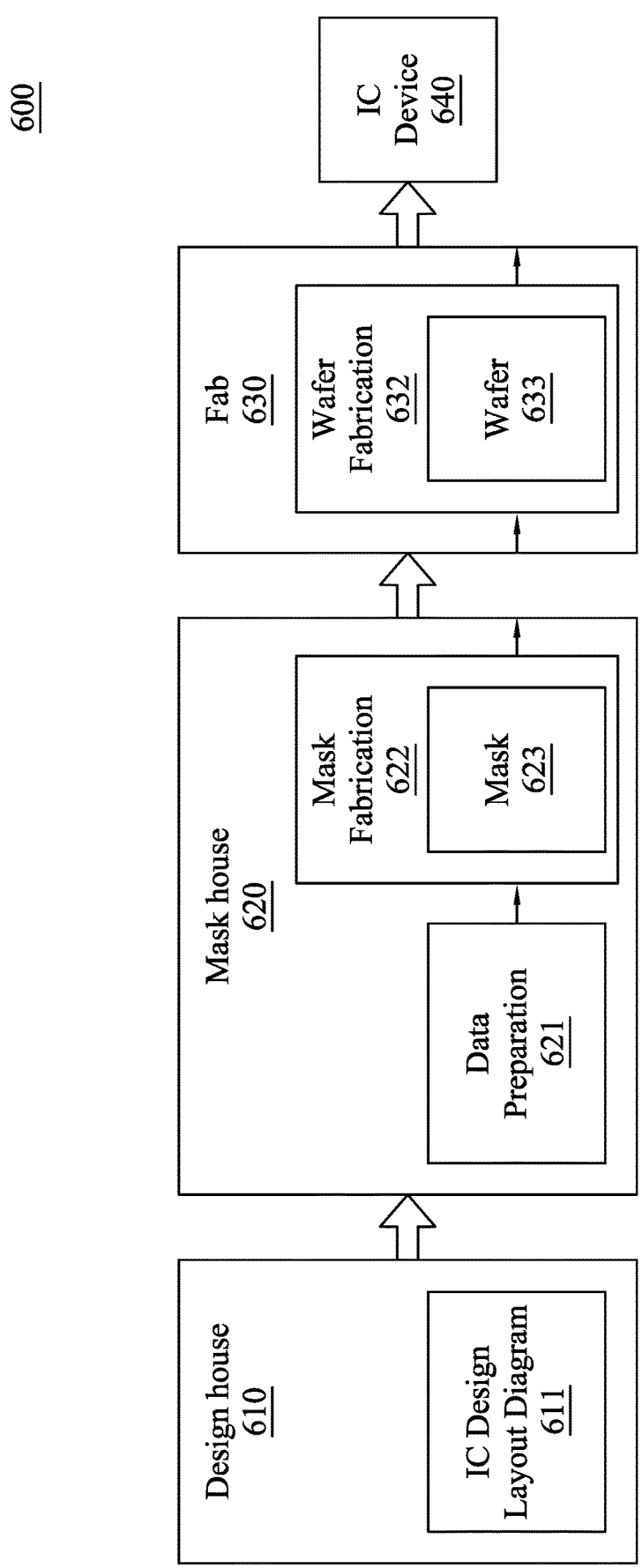
FIG. 6 is a block diagram of an integrated circuit manufacturing system, and an integrated circuit manufacturing flow associated therewith, in accordance with some embodiments.

FIG. 6 is a block diagram of IC manufacturing system 600, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using IC manufacturing system 600.

In FIG. 6, IC manufacturing system 600 includes entities, such as a design house 610, a mask house 620, and an IC manufacturer/fabricator ("fab") 630, that interact with one another in the design, development, and manufacturing cycles and/or services related to manufacturing an IC device 640. The entities in IC manufacturing system 600 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 610, mask house 620, and IC fab 630 is owned by a single larger company. In some embodiments, two or more of design house 610, mask house 620, and IC fab 630 coexist in a common facility and use common resources.

Design house (or design team) 610 generates an IC design layout diagram 611. IC design layout diagram 611 includes various geometrical patterns, for example, IC layout designs depicted in FIGS. 2A, 2D, 2E and 4A, designed for an IC device 640, for example, the memory devices 100 and 300, discussed above with respect to FIGS. 1-4D. The geometrical patterns correspond to patterns of metal, oxide, or semiconductor layers that make up the various components of IC device 640 to be fabricated. The various layers combine to form various IC features. For example, a portion of IC design layout diagram 611 includes various IC features, such as an active region, gate electrode, source and drain, conductive segments or vias of an interlayer interconnection, to be formed in a semiconductor substrate (such as a silicon wafer) and various material layers disposed on the semiconductor substrate. Design house 610 implements a proper design procedure to form IC design layout diagram 611. The design procedure includes one or more of logic design, physical design or place and route. IC design layout diagram 611 is presented in one or more data files having information of the geometrical patterns. For example, IC design layout diagram 611 can be expressed in a GDSII file format or DFII file format.

Mask house 620 includes data preparation 621 and mask fabrication 622. Mask house 620 uses IC design layout diagram 611 to manufacture one or more masks 623 to be used for fabricating the various layers of IC device 640 according to IC design layout diagram 611. Mask house 620 performs mask data preparation 621, where IC design layout diagram 611 is translated into a representative data file ("RDF"). Mask data preparation 621 provides the RDF to mask fabrication 622. Mask fabrication 622 includes a mask writer. A mask writer converts the RDF to an image on a substrate, such as a mask (reticle) 623 or a semiconductor wafer 633. The IC design layout diagram 611 is manipulated by mask data preparation 621 to comply with particular characteristics of the mask writer and/or requirements of IC fab 630. In FIG. 6, data preparation 621 and mask fabrication 622 are illustrated as separate elements. In some embodiments, data preparation 621 and mask fabrication 622 can be collectively referred to as mask data preparation.

In some embodiments, data preparation 621 includes optical proximity correction (OPC) which uses lithography enhancement techniques to compensate for image errors, such as those that can arise from diffraction, interference, other process effects and the like. OPC adjusts IC design layout diagram 611. In some embodiments, data preparation 621 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, data preparation 621 includes a mask rule checker (MRC) that checks the IC design layout diagram 611 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 611 to compensate for limitations during mask fabrication 622, which may undo part of the modifications performed by OPC in order to meet mask creation rules.

In some embodiments, data preparation 621 includes lithography process checking (LPC) that simulates processing that will be implemented by IC fab 630 to fabricate IC device 640. LPC simulates this processing based on IC design layout diagram 611 to create a simulated manufactured device, such as IC device 640. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 611.

It should be understood that the above description of data preparation 621 has been simplified for the purposes of clarity. In some embodiments, data preparation 621 includes additional features such as a logic operation (LOP) to modify the IC design layout diagram 611 according to manufacturing rules. Additionally, the processes applied to IC design layout diagram 611 during data preparation 621 may be executed in a variety of different orders.

After data preparation 621 and during mask fabrication 622, a mask 623 or a group of masks 623 are fabricated based on the modified IC design layout diagram 611. In some embodiments, mask fabrication 622 includes performing one or more lithographic exposures based on IC design layout diagram 611. In some embodiments, an electron-beam (e-beam) or a mechanism of multiple e-beams is used to form a pattern on a mask (photomask or reticle) 623 based on the modified IC design layout diagram 611. Mask 623 can be formed in various technologies. In some embodiments, mask 623 is formed using binary technology. In some embodiments, a mask pattern includes opaque regions and transparent regions. A radiation beam, such as an ultraviolet (UV) beam, used to expose the image sensitive material layer (for example, photoresist) which has been coated on a wafer, is blocked by the opaque region and transmits through the transparent regions. In one example, a binary mask version of mask 623 includes a transparent substrate (for example, fused quartz) and an opaque material (for example, chromium) coated in the opaque regions of the binary mask. In another example, mask 623 is formed using a phase shift technology. In a phase shift mask (PSM) version of mask 623, various features in the pattern formed on the phase shift mask are configured to have proper phase difference to enhance the resolution and imaging quality. In various examples, the phase shift mask can be attenuated PSM or alternating PSM. The mask(s) generated by mask fabrication 622 is used in a variety of processes. For example, such a mask(s) is used in an ion implantation process to form various doped regions in semiconductor wafer 633, in an etching process to form various etching regions in semiconductor wafer 633, and/or in other suitable processes.

IC fab 630 includes wafer fabrication 632. IC fab 630 is an IC fabrication business that includes one or more manufacturing facilities for the fabrication of a variety of different IC products. In some embodiments, IC Fab 630 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 630 uses mask(s) 623 fabricated by mask house 620 to fabricate IC device 640. Thus, IC fab 630 at least indirectly uses IC design layout diagram 611 to fabricate IC device 640. In some embodiments, semiconductor wafer 633 is fabricated by IC fab 630 using mask(s) 623 to form IC device 640. In some embodiments, the IC fabrication includes performing one or more lithographic exposures based at least indirectly on IC design layout diagram 611. Semiconductor wafer 633 includes a silicon substrate or other proper substrate having material layers formed thereon. Semiconductor wafer 633 further includes one or more of various doped regions, dielectric features, multi-level interconnects, and the like (formed at subsequent manufacturing steps).

Based on the discussion above, the present application provides a memory device. By increasing the reading path of the memory cell of the memory device, the speed of the memory device enhances. Moreover, by adopting the CFET structure including two N-typed FETs which are vertically arranged with each other, the gates of the NFETs are located on different layers so as to save the area of the memory device with two separated gate signals.

According to some embodiments of the present disclosure, a memory device is provided, including a first memory cell including a first transistor and a second transistor coupled to the first transistor in parallel, wherein gates of the first transistor and the second transistor are coupled to each other, and the gates of the first transistor and the second transistor pass different layers and overlap with each other, wherein types of the first transistor and the second transistor are a same.

According to some embodiments of the present disclosure, a memory device is provided. The memory device includes a first memory cell including a first transistor including a first terminal configured to receive a first bit line signal and a first gate terminal configured to receive a first word line signal and a second transistor including a second terminal configured to receive a second bit line signal and a second gate terminal configured to receive a second word line signal. The first gate terminal of the first transistor and the second gate terminal of the second transistor are located on different layers, and types of the first transistor and the second transistor are a same. The memory device further includes a first multiplier coupled to the first terminal of the first transistor and the second terminal of the second transistor, and configured to select a first voltage level stored in the first transistor or a second voltage level stored in the second transistor.

According to some embodiments of the present disclosure, a memory device is provided, including a first memory cell including at least two first transistors coupled to each other in parallel, wherein gates of the at least two first transistors are coupled to each other, and located on different layers and a second memory cell including at least two second transistors coupled to each other in parallel. Gates of the at least two second transistors are located on different layers, wherein the gate of one of the at least two first transistors and the gate of one of the at least two second transistors are located on a same layer, and types of the at least two first transistors and the at least two second transistors are a same.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a first memory cell comprising:
   a first transistor; and
   a second transistor coupled to the first transistor in parallel, wherein gates of the first transistor and the second transistor are coupled to each other,
   wherein an active area of the first transistor and an active area of the second transistor extend in a first direction and overlap with each other in a layout view, and the gates of the first transistor and the second transistor extend in a second direction to pass different layers and the active area of the first and second transistors, the second direction being different from the first direction, wherein types of the first transistor and the second transistor are a same.

2. The memory device of claim 1, wherein a first gate of the first transistor and a second gate of the second transistor are configured to receive a word line signal.

3. The memory device of claim 1, wherein a first voltage level stored in the first transistor and a second voltage level stored in the second transistor are a same.

4. The memory device of claim 1, wherein a first bit line signal received by a first terminal of the first transistor and a second bit line signal received by a second terminal of the second transistor are a same.

5. The memory device of claim 1, wherein a first terminal of the first transistor and a second terminal of the second transistor are configured to receive a ground signal.

6. The memory device of claim 1, further comprising:
   a second memory cell comprising:
   a third transistor; and
   a fourth transistor coupled to the third transistor in parallel, wherein gates of the third transistor and the fourth transistor are coupled to each other, and the gates of the third transistor and the fourth transistor pass the different layers, wherein types of the first transistor, the second transistor, the third transistor, and the fourth transistor are a same.

7. The memory device of claim 6, wherein a first gate of the first transistor and a second gate of the second transistor are configured to receive a first word line signal, and a third gate of the third transistor and a fourth gate of the fourth transistor are configured to receive a second word line signal being different from the first word line signal.

8. The memory device of claim 6, wherein a first voltage level stored in the first transistor and a second voltage level stored in the second transistor are a same, a third voltage level stored in the third transistor and a fourth voltage level stored in the fourth transistor are a same, and the first voltage level stored in the first transistor and the third voltage level stored in the third transistor are different.

9. The memory device of claim 1, further comprising:
   a second memory cell comprising:
   a third transistor; and
   a fourth transistor coupled to the third transistor in parallel, wherein gates of the third transistor and the fourth transistor are coupled to each other, and the gates of the third transistor and the fourth transistor are located on different layers, wherein types of the first transistor, the second transistor, the third transistor, and the fourth transistor are a same;
   wherein a first terminal of the first transistor and a second terminal of the second transistor are configured to receive a first bit line signal, and a third terminal of the third transistor and a fourth terminal of the fourth transistor are configured to receive a second bit line signal being different from the first bit line signal.

10. The memory device of claim 9, wherein a fifth terminal of the first transistor and a sixth terminal of the second transistor are configured to receive a ground signal, and a seventh terminal of the third transistor and an eighth terminal of the fourth transistor are configured to receive a floating signal.

11. The memory device of claim 9, further comprising:
    a multiplexer coupled to the first transistor and the second transistor of the first memory cell and the third transistor and the fourth transistor of the second memory cell, and configured to output a first voltage level stored in the first transistor and the second transistor of the first memory cell or output a second voltage level stored in the third transistor and the fourth transistor of the second memory cell.

12. A memory device, comprising:
    a first memory cell comprising:
    a first transistor comprising:
    a first terminal configured to receive a first bit line signal; and
    a first gate terminal configured to receive a first word line signal;
    a second transistor comprising:
    a second terminal configured to receive a second bit line signal; and
    a second gate terminal configured to receive a second word line signal, wherein the first gate terminal of the first transistor and the second gate terminal of the second transistor are located on different layers, and types of the first transistor and the second transistor are a same;
    a first multiplexer coupled to the first terminal of the first transistor and the second terminal of the second transistor, and configured to select a first voltage level stored in the first transistor or a second voltage level stored in the second transistor.

13. The memory device of claim 12, wherein the first voltage level stored in the first transistor and the second voltage level stored in the second transistor are different.

14. The memory device of claim 12, wherein the first transistor comprises a third terminal, and the third terminal is configured to receive a ground signal, wherein the second transistor comprises a fourth terminal, and the fourth terminal is configured to receive a floating signal.

15. The memory device of claim 12, further comprising:
    a second memory cell comprising:
    a third transistor comprising:
    a third terminal configured to receive a third bit line signal; and
    a third gate terminal configured to receive a third word line signal;
    a fourth transistor comprising:
    a fourth terminal configured to receive a fourth bit line signal; and a fourth gate terminal configured to receive a fourth word line signal, wherein the third gate terminal of the third transistor and the fourth gate terminal of the fourth transistor are located on different layers, and types of the third transistor and the fourth transistor are a same;

a second multiplexer coupled to the third terminal of the third transistor and the fourth terminal of the fourth transistor, and configured to select a third voltage level stored in the third transistor or a fourth voltage level stored in the fourth transistor.

16. The memory device of claim 15, wherein the third voltage level stored in the third transistor and the fourth voltage level stored in the fourth transistor are different.

17. The memory device of claim 15, wherein the first transistor and the third transistor are configured to receive a ground signal, and the second transistor and the fourth transistor are configured to receive a floating signal.

18. A memory device, comprising:
a first memory cell comprising:
at least two first transistors coupled to each other in parallel, wherein gates of the at least two first transistors are coupled to each other, and located on different layers,
wherein active areas of the at least two first transistors overlap with each other in a layout view; and a second memory cell comprising:
at least two second transistors coupled to each other in parallel, wherein gates of the at least two second transistors are located on different layers, wherein the gate of one of the at least two first transistors and the gate of one of the at least two second transistors are located on a same layer, and types of the at least two first transistors and the at least two second transistors are a same.

19. The memory device of claim 18, wherein the gate of another one of the at least two first transistors and the gate of another one of the at least two second transistors are located on a same layer.

20. The memory device of claim 18, wherein the gate of one of the at least two first transistors and the gate of another one of the at least two second transistors are located on different layers.

* * * * *